Figure 1:
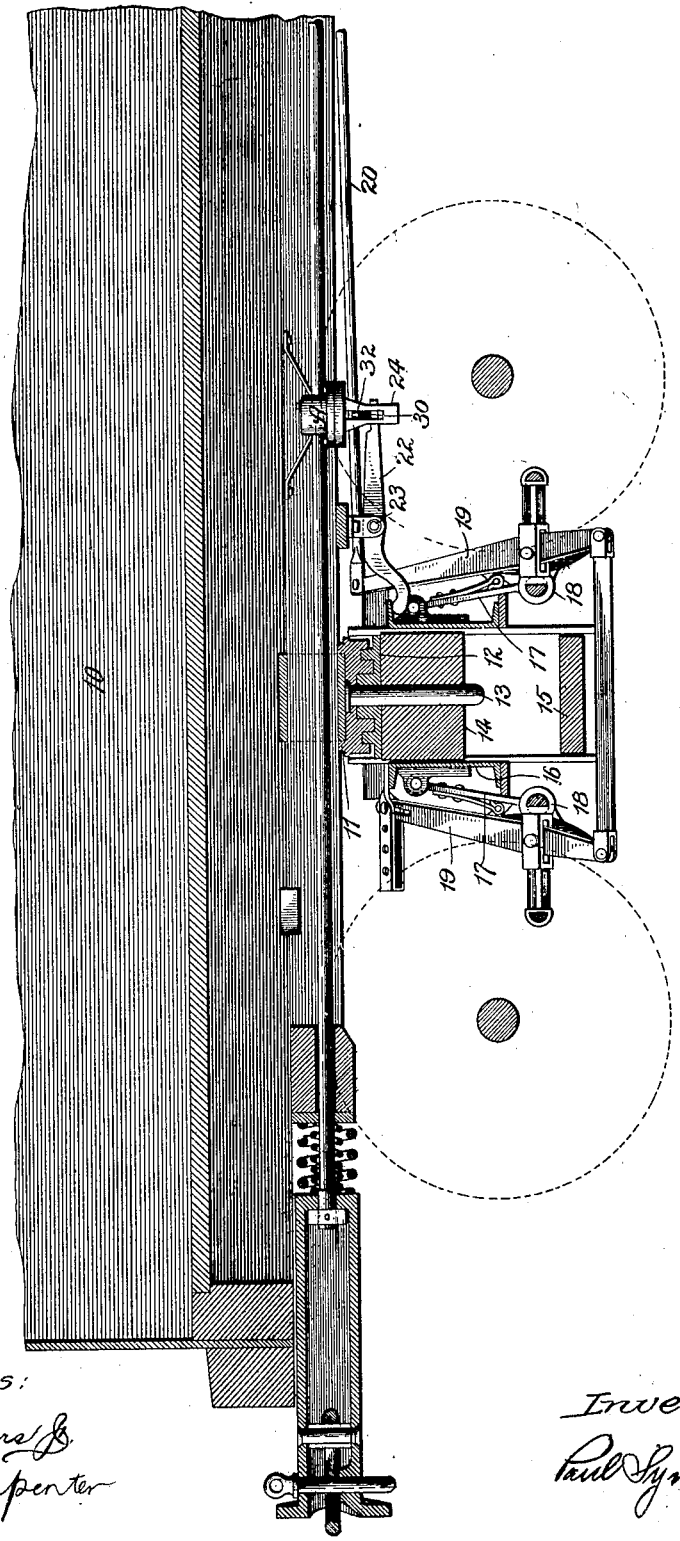

No. 892,195. PATENTED JUNE 30, 1908.
P. SYNNESTVEDT.
LOAD BRAKE APPARATUS.
APPLICATION FILED NOV. 3, 1902.

4 SHEETS—SHEET 1.

No. 892,195.

PATENTED JUNE 30, 1908.

P. SYNNESTVEDT.
LOAD BRAKE APPARATUS.
APPLICATION FILED NOV. 3, 1902.

4 SHEETS—SHEET 2.

WITNESSES:

INVENTOR.

No. 892,195. PATENTED JUNE 30, 1908.
P. SYNNESTVEDT.
LOAD BRAKE APPARATUS.
APPLICATION FILED NOV. 3, 1902.

4 SHEETS—SHEET 4.

WITNESSES:
John Enders Jr.
Paul Carpenter

INVENTOR.
Paul Synnestvedt

UNITED STATES PATENT OFFICE.

PAUL SYNNESTVEDT, OF PITTSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

LOAD-BRAKE APPARATUS.

No. 892,195.  Specification of Letters Patent.  Patented June 30, 1908.

Application filed November 3, 1902. Serial No. 129,888.

*To all whom it may concern:*

Be it known that I, PAUL SYNNESTVEDT, a citizen of the United States of America, and a resident of Pittsburg, in the county of Allegheny and State of Pennsylvania, have invented a certain new and useful Improvement in Load-Brake Apparatus, of which the following is a specification.

My invention relates to air brakes, such as are commonly used on railway cars, and it has for its principal object to provide means whereby the braking of a car may be properly proportioned to the load carried by the car, which means shall be positive and uniform in operation and of superior efficiency.

A further object of my present invention is to provide for the automatic regulation of the degree of braking pressure supplied to the wheels of the car, which shall be in proportion to the load on the car and shall furthermore be regulated not by the smaller vacillations in said pressure, but by the mean position of the body of the car with relation to the truck or the wheels.

A further object of my invention is to provide means by which each individual car may have its braking power regulated by the load therein without affecting the air pressure in the main train pipe or in any way affecting the brake apparatus of the other cars.

A further object of my invention is to provide an auxiliary brake cylinder and reservoir by which auxiliary braking power is applied to the car when it is loaded in addition to the brake power used when it is not loaded.

A further object of my invention is to provide an automatic cut-out valve and brake cylinder thrown into action when the car is loaded.

A further object of my invention is to provide means by which the supply of air pressure in an auxiliary load brake device may be regulated by the mean position of the car body with respect to the truck, whereby the air supply of the load brake mechanism may be positively applied and yet not affected by the momentary vibrations in the position of the car body.

The above objects, as well as other advantages which will hereinafter appear, I attain by means of apparatus which is set forth in the following specification and illustrated in preferred form in the accompanying drawings, in which,—

Figure 2:
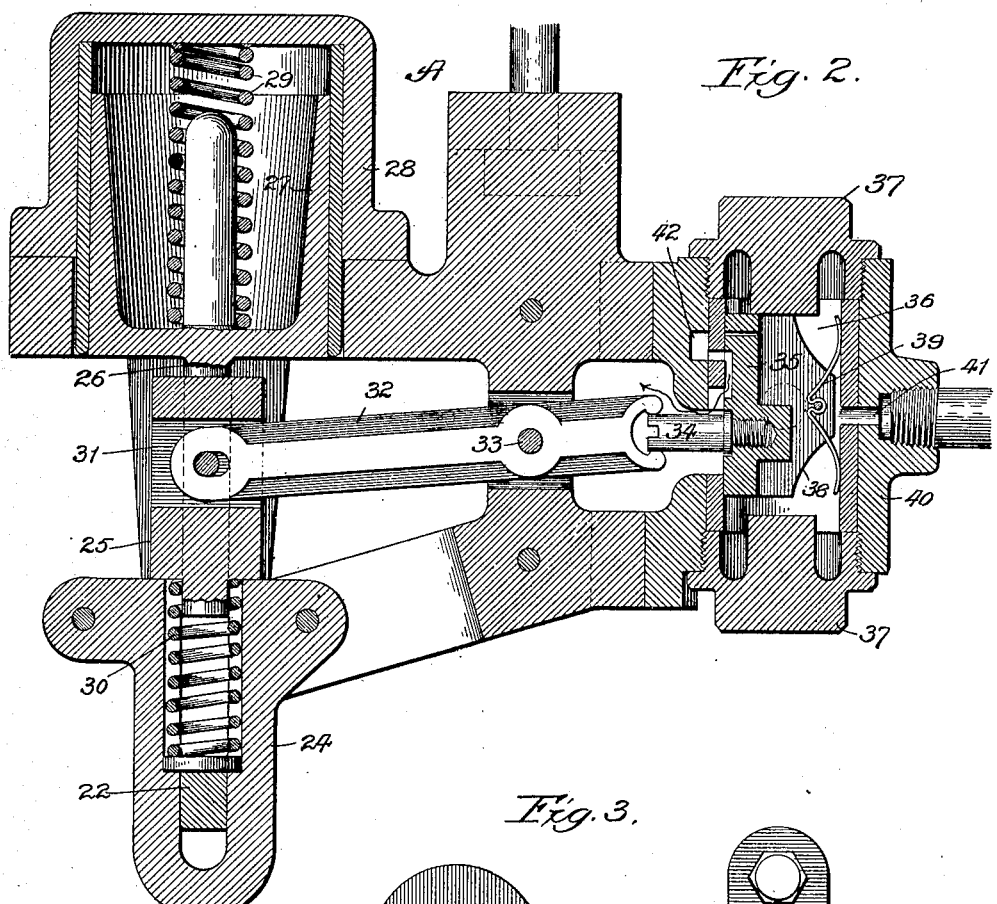
Figure 3:
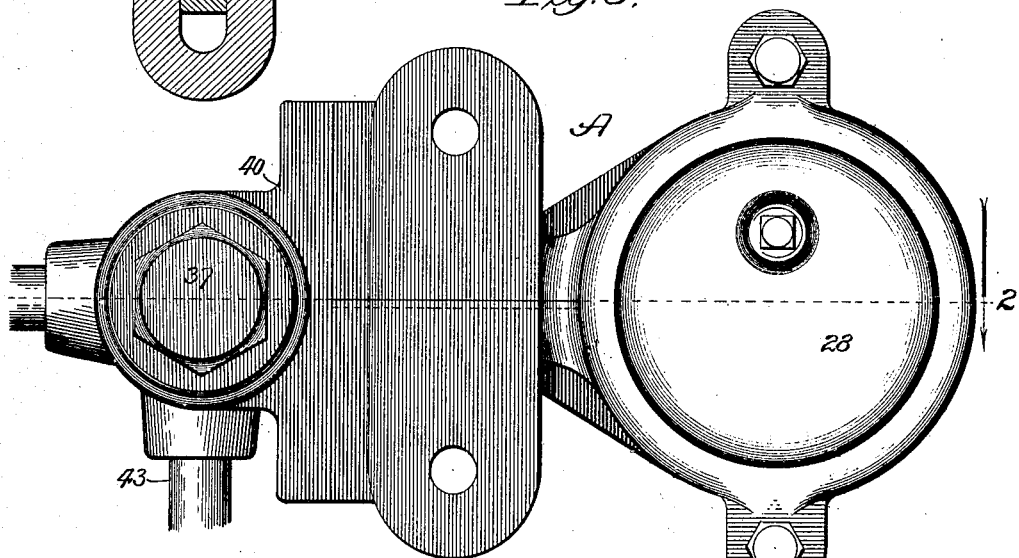
Figure 4:
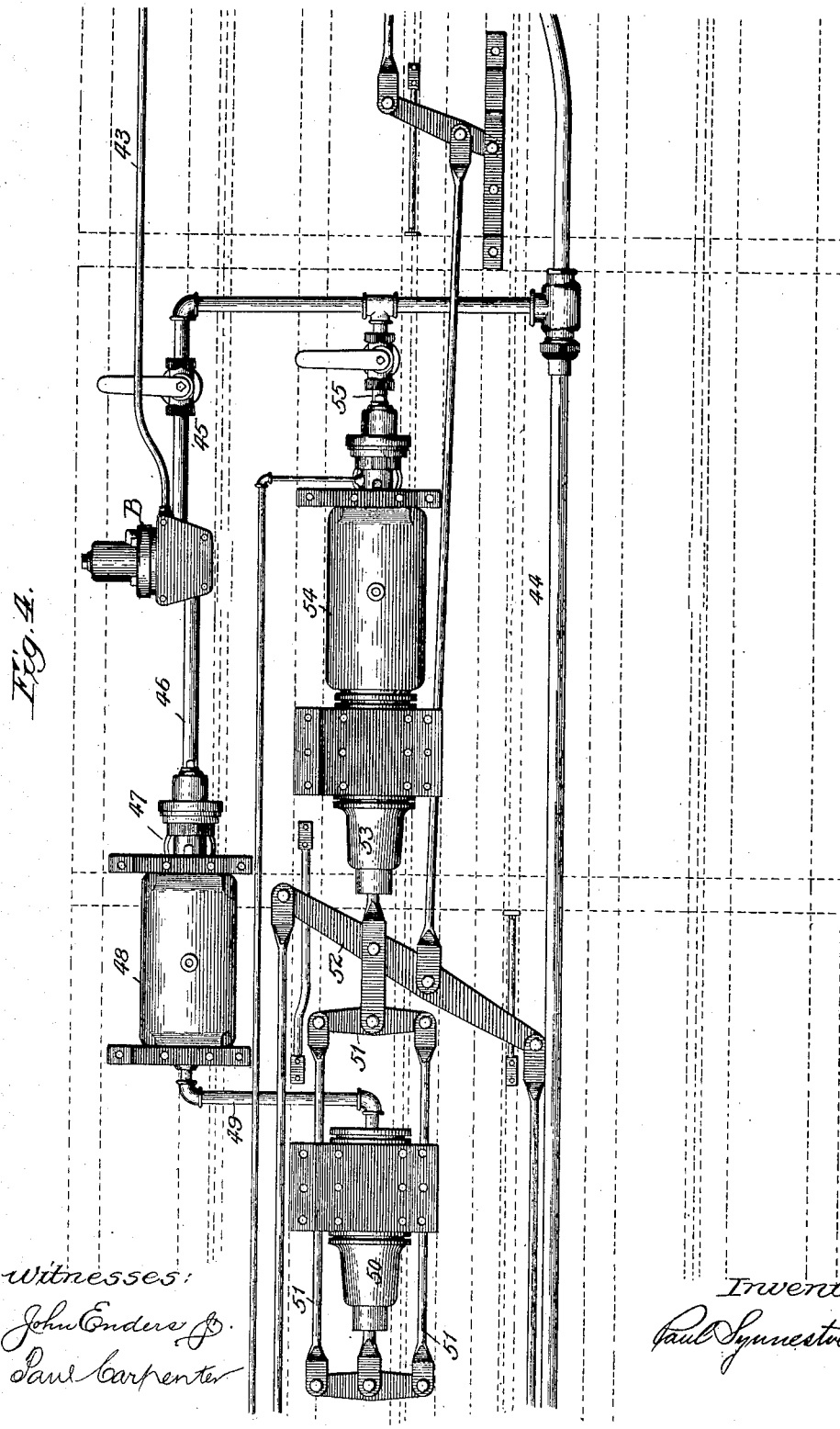
Figure 5:
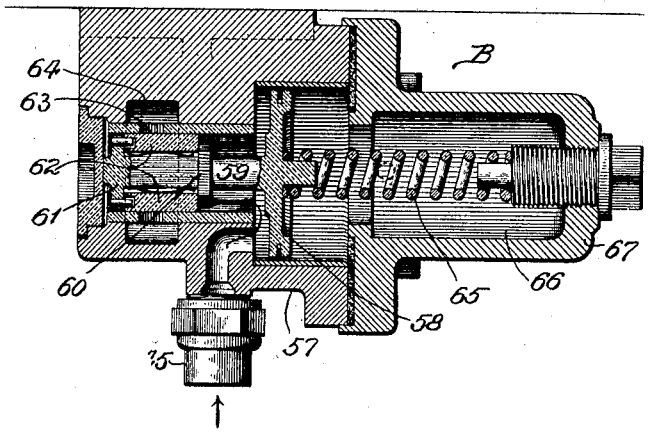
Figure 6:
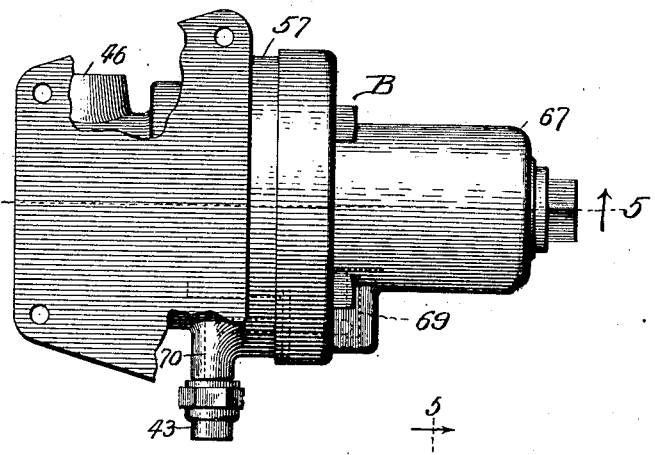
Figure 7:
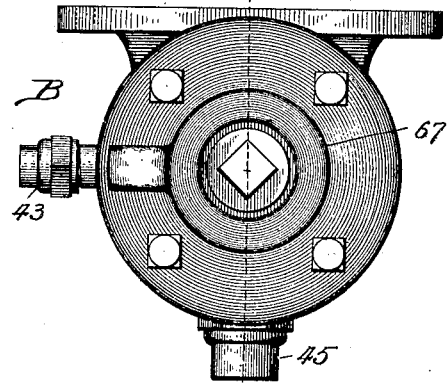

Figure 1 is a side elevation, partially in section, of the brake gear on the truck of a car, showing my regulating device for the cut-out valve. Figure 2 shows a central vertical section, on line 2 of Figure 3, of the governing valve which I use, together with the mechanism for operating the same. Figure 3 shows a top plan view of the device shown in section in Figure 2. Figure 4 is a plan view of the ordinary brake apparatus, with the load brake apparatus shown in connection therewith. Figure 5 is a central vertical section of my improved cut out valve, taken on line 5 of Figures 6 and 7. Figure 6 is a top plan view, (partially broken away,) of the same. Figure 7 is an end elevation of the cut-out valve.

In operation of railway brakes it is well known that the degree of pressure necessary to exert upon the brakes for the greatest efficiency varies with the weight of the car. Heretofore apparatus has been devised by which an additional braking power is supplied to the brakes when the car is loaded, but in all such devices the adjustment of the mechanism used for throwing on the extra brake pressure has been affected by the momentary vacillations of the car body itself, that is to say the position of the car body with respect to the trucks; and the amount of pressure which is applied to the brakes is therefore not dependent solely upon the mean position of the car body, but varies with all the variations due to jolting of the car. From this it results that the braking is sometimes heavier than necessary and then again not heavy enough, while the proper operation of the auxiliary braking device is always interfered with by these changes in position of the car body. Furthermore it has heretofore been necessary to have a high enough pressure supplied throughout the train pipe to operate all the auxiliary braking cylinders, whether they are needed or not; and though some of the cars in the train are not loaded the necessary pressure is always maintained for operating a fully loaded train with all the auxiliary braking apparatus in use.

I have obviated all these difficulties by providing means by which each car has its independent auxiliary braking device; and by providing also that the governing valve which supplies pressure to the cut-out valve to introduce the extra load braking power is governed not by the temporary vibrations of the car body but by the mean position which the car body assumes with respect to the truck. That is to say, when a car is loaded an independent auxiliary braking means is always ready for use and is not dependent upon the temporary jolting of the car; so that under no circumstances can an unloaded car be jolted so as to throw on the load brake apparatus, nor on the other hand can a loaded car ever by that means disarrange the apparatus so that the load brake device will not be in working order and ready for instant use.

In Figure 1 is shown the governing device (A) in its position on the car body. 10 represents the car body, 11 and 12 are the center plates therefor, 13 is the center pin, 14 is the bolster, 15 the spring plank, 16 the transom, 18 and 19 the brake block and lever,—the operation of all which elements will be readily understood. A pivot 23 is provided on the car body, which carries the lever 22 with one end engaging the transom 16 and the other having a bearing, inside the hanger 24, upon the mechanism of the governing valve (A).

Referring now to Figure 2, it will be seen that the end of the lever bar 22, oscillating in the hangers 24, is placed beneath a compression spring 30. The top of the spring 30 is in contact with the crosshead 25 which carries the rod 26 having a plunger 27 moving inside the dash pot 28. It will be evident at once from this construction, that the temporary vibration of the bar 22 due to the jolting of the car will be taken up by the spring 30, but that any persistent pressure upon the bar 22 in either direction will result in slowly moving the piston 27 to a new position,—the spring 29 being stronger than spring 30.

The cross head 25 carries on a pivot the end of the lever 32 which is pivoted at 33 and at its other end embraces the pin 34 on the slide valve 35. The slide valve is of the usual construction, being a block between the wings 38, pressed down into its place by the spring 39 to insure close contact of its face. By means of the opening 41 the valve chamber 40 is connected directly to the train pipe. It will be evident that the shifting of position of the lever 32, and therefore of the slide valve 35 will open or close the valve port 42 which leads directly to the pipe 43 and will therefore introduce train pipe pressure to pipe 43 or else cut off entirely and exhaust the pipe 43, according to whether the car is empty or loaded. This pipe 43 leads directly to the cut out valve and by means of this valve (see Figure 4), train pipe air is admitted by the pipes 45 and 46, through the cut-out valve and triple valve to supply the load brake reservoir 48 and from thence is admitted through pipe 49 to the load brake cylinder 50. This load brake cylinder carries on its piston rod a yoke 51 by means of which it is attached to the beam 52 of the ordinary brake cylinder 53, fed by the reservoir 54 and pipe 55, leading from the train pipe 44, and thereby assists in the operation of applying the brakes, as will be readily understood by those familiar with this art.

The cut-out valve (B) for the load brake cylinder is shown in detail in Figures 5, 6, and 7. Referring to Figure 5 more particularly, there is a short cylinder 57 containing a piston 58 which has a rod or stem 59 provided with two collars 60, 61, between which are slide valves reciprocating in the valve chamber and held to their seats by springs, as is customary. The under portion of the piston chamber is connected by a passage with the branch 45 of the train pipe 44, and when the piston is thrown back against the compression spring 65 the slide valve opens communication through the port 63 and chamber 64 to the pipe 46 leading mediately to the load brake cylinder.

The hollow cap cover 67 of the short cylinder 57 incloses a chamber at the rear of the piston 58 which has communication through ports 69 and 70 with the pipe 43 leading from the governing valve (A) as before described. Normally the position of the cut-out valve is as shown in Figure 5, when it will be seen that if the governing valve (A) is open, the train pipe pressure is exerted on both sides of piston 58 and the same being balanced it is held in this position by spring 65. On loading the car however, the action of the lever 22 (in Figure 1) closes the communication between the train pipe and pipe 43. The pressure thus being released on the rear of piston 58 the train pipe pressure in pipe 45 will itself open the slide valve ports and enter the pipe 46, thus throwing the load brake reservoir and cylinder into operative position to act in consonance with the ordinary brake apparatus.

By this apparatus there is provided an independent load brake for each car, which is automatically put into operative condition when the car is loaded, and thrown out of operative condition when the car is again emptied. The pressure required in the train pipe is the same as in ordinary cases and the ordinary action of the air brake is not in any way modified or interfered with. By reason of the positive action of the cut-out valve and the retarding device introduced in the valve forming the same, the load brake apparatus is not affected by any but the permanent mean position of the car, or condition of loading. The retarding device to compensate for temporary variations in the position of the car body due to jolting etc., is almost *sine qua non* in apparatus of this kind, because otherwise it will frequently happen that the load brake mechanism is thrown out of operative condition just at the time when it is most needed, as in case of derailment. I do not limit myself to the dash pot shown in Figure 2 but may use any other mechanism for this purpose that will perform the function of preventing any but a permanent change in the position of the car body from manipulating the governing valve.

The mere provision of an auxiliary braking apparatus to be applied when the car is loaded I do not lay claim to; but having thus described my invention and its use, what I do claim, and desire to secure by Letters Patent, is the following:

1. The combination of a load brake apparatus and a governor therefor controlled by the mean or permanent variations of relative positions of the car body and truck, and a lost motion device spring held in both directions for neutralizing the effect of temporary vibrations.

2. In load brake apparatus the combination of a brake cylinder, a fluid pressure actuated cut-out valve and a fluid pressure governing valve to control the pressure operating the cut-out valve.

3. In load brake apparatus for cars the combination of a load brake cylinder, a fluid pressure actuated cut-out valve therefor and a fluid pressure governing valve for the cut-out operated by relative movements of the car body and trucks.

4. In a load brake apparatus for cars the combination of a load brake cylinder a cut-out valve and a governing device for the valve controlling the same only in accordance with the mean position of the car body.

5. In load brake apparatus for cars the combination of a load brake cylinder, a fluid pressure operated cut-out valve, a governing device for the pressure in the cut-out valve operated only by the permanent changes of position of the car body, substantially as described.

6. The combination of a fluid pressure cut-out valve, a governing valve for the pressure therein, and mechanism operating the governing valve which moves the same only with permanent changes in the position of an attached car body.

7. In a car brake apparatus the combination of a fluid pressure actuated cut-out valve, a governing valve for the pressure therein, an element attached to the car body and the valve for shifting the latter by permanent changes in the position of the car body but preventing such shifting by momentary oscillations of the car body as described.

8. In an air brake apparatus the combination of a cut-out valve operated by fluid pressure, a governing valve for said pressure, an element mediately moving said governing valve and a retarding device between said moving element and said governing valve, whereby the latter valve is shifted only by changes in the mean position of the moving element.

9. In load brake apparatus the combination with a governing valve and a shifting device therefor, of a moving element mediately operating the shifting device, and a retarding spring and dash pot to take up the rapid motions of the moving element, interposed between it and the shifting element, for the purposes set forth.

10. The combination of a governing valve, a shifting element therefor provided with a retarding device, an actuator having a yielding connection with said shifting element, substantially as described.

11. The combination with a car body and truck, of a lever oscillated by their relative movements, a retarding device yieldingly connected to said lever and a valve shifting mechanism connected with said retarding device.

12. The combination of a valve, an arm for shifting the same, a retarding device connected to said arm, and an actuator for said retarding device, spring connected thereto, substantially as described.

13. The combination of a load brake apparatus and a governor therefor controlled by the mean or permanent variations of relative positions of the car body and truck, and a damper provided with opposing springs to retard and neutralize the effects of temporary vibration.

14. In load brake apparatus the combination with a governing valve and a shifting device therefor, of a moving element mediately operating the shifting device, and resilient retarding means and a dash pot to take up the rapid motions of the moving element, interposed between it and the shifting element, substantially as described.

In testimony whereof I have hereunto signed my name, in the presence of the subscribed witnesses.

PAUL SYNNESTVEDT.

Witnesses:
 PAUL CARPENTER,
 RALPH W. HICKS.